United States Patent [19]
Takeuchi

[11] Patent Number: 5,876,297
[45] Date of Patent: Mar. 2, 1999

[54] TENSION MEMBER FOR A POWER TRANSMISSION BELT HAVING A BRAIDING PITCH TO DIAMETER RATIO WITHIN A SPECIFIC RANGE TO INCREASE THE FLEX FATIGUE RESISTANCE OF THE BELT

[75] Inventor: Yuji Takeuchi, Kobe, Japan

[73] Assignee: Bando Chemical Industries, Ltd., Kobe, Japan

[21] Appl. No.: 753,500

[22] Filed: Nov. 26, 1996

[30]  Foreign Application Priority Data

Dec. 26, 1995 [JP] Japan .................................... 7-338400

[51] Int. Cl.$^6$ .............................. F16G 1/10; F16G 1/128
[52] U.S. Cl. ................................. 474/202; 474/204; 87/13
[58] Field of Search .............................. 87/1, 3, 4, 8, 13; 474/202, 204

[56] References Cited

FOREIGN PATENT DOCUMENTS 3-211041  9/1991  Japan .
3-213747  9/1991  Japan .
3-244848  10/1991  Japan .

Primary Examiner—Daniel P. Stodola
Assistant Examiner—Gregory J. Strimbu
Attorney, Agent, or Firm—Sixbey Friedman Leedom & Ferguson; Gerald J. Ferguson, Jr.; Thomas W. Cole

[57] ABSTRACT

A tension member of a power transmission belt is formed of a braided cord composed of four aramid fiber strands having the same yarn number. The yarn number of the aramid fiber strands is 700 denier to 1300 denier. A ratio p/d of a braiding pitch p of the braided cord to a diameter d thereof is $3.7 \leq p/d \leq 5.5$. Thereby increasing the flex fatigue resistance of the power transmission belt.

6 Claims, 2 Drawing Sheets

TENSION MEMBER FOR A POWER TRANSMISSION BELT HAVING A BRAIDING PITCH TO DIAMETER RATIO WITHIN A SPECIFIC RANGE TO INCREASE THE FLEX FATIGUE RESISTANCE OF THE BELT

BACKGROUND OF THE INVENTION

This invention relates to a tension member for belt used in various kinds of belts and a power transmission belt using the same.

A power transmission belt such as a synchronous belt, a V-belt, a flat belt and a ribbed belt requires a high strength, a high modulus of elasticity and a high dimensional stability. To satisfy these required properties, reinforcements such as a reinforcing cord made of fibers and a reinforcing fabric are embedded in a body of the power transmission belt. Such reinforcements are generally formed with the use of a twist yarn formed in a way of twisting a plurality of fiber strands. Twist yarns are classified, by twisting manner, under several types such as a piled yarn, a single twist yarn and a Lang's twist yarn.

Such a power transmission belt using the twist yarn as a tension member may not sufficiently respond to the demands of the market for higher durability, dimensional stability and the like. To cope with this, there is proposed a technique in which a tension member is formed of a braided cord instead of a twist yarn (See Japanese Patent Application Laid-Open Gazettes Nos. 3-211041, 3-213747 and 3-244848).

However, the demands of the market on a power transmission belt have extended to an increasingly higher level in recent years and the power transmission belt is used under the hostile conditions of a high load, a high temperature and the like. In consideration of this, it is desired to improve the tension member formed of the above-mentioned braided cord.

An object of the present invention is to improve a braided cord as a tension member for power transmission belt thereby increasing the flex fatigue resistance of the belt.

SUMMARY OF THE INVENTION

The inventor has examined the mechanism of fatigue of the above-mentioned braided cord for a long time, and has found that a relative displacement between fiber strands of the braided cord occurs when the belt is bent along a pulley whereby an abrasion occurs between the fiber strands, and the abrasion is a cause of the braided cord fatigue.

To attain the above object, in the present invention, a braided cord formed of four aramid fiber strands having the same yarn number is so composed that a ratio of a braiding pitch to a cord diameter is set in a range of suitable values, whereby a friction between the aramid fiber strands of the braided cord can be suppressed.

More specifically, a tension member using the braided cord according to the present invention is so composed that a ratio p/d of a braiding pitch p of the braided cord to a diameter d of the braided cord satisfies the following relationship:

$$3.7 \leq p/d \leq 5.5$$

When the value of p/d is below 3.7, variations in quality become large due to the limited manufacturing performance of a braiding machine. On the other hand, when the value of p/d is over 5.5, it becomes difficult to restrict motions of the aramid fiber strands so that damages of the braided cord due to friction between the fiber strands become heavy.

According to the present invention, since the braided cord formed of four aramid fiber strands having the same yarn number is so composed that the value of p/d satisfies the above-mentioned relationship, the occurrence of a friction between fiber strands accompanying the belt run can be restrained thereby suppressing abrasion to be produced inside the braided cord. This increases the flex fatigue resistance of the belt.

Another aspect of the invention is characterized in that in the above-mentioned tension member for belt, each of the aramid fiber strands is set at a yarn number of 700 denier to 1300 denier.

When the yarn number of each aramid fiber strand is below 700 denier, the strength per belt width cannot sufficiently be obtained. On the other hand, when the yarn number of each aramid fiber strand is over 1300 denier, the diameter of the braided cord becomes large. This makes it difficult to obtain an excellent flexure of a power transmission belt when the belt is used in such a manner as to be wrapped around a small-diameter pulley.

According to the above aspect of the invention, even in the use under the small-pulley driving mechanism, the belt can perform an excellent flex fatigue resistance while securing a desired strength.

Still another aspect of the present invention is a power transmission belt comprising the above tension member for belt.

Further, still another aspect of the present invention premises a synchronous belt comprising: a tension member extending over the length of the belt; a backing rubber part bonded on an outer peripheral side of the tension member; and a multiplicity of tooth rubber parts which are bonded on an inner peripheral side of the tension member and are arranged at specific intervals in a longitudinal direction of the belt, and is characterized in that the tension member used in the synchronous belt is the above-mentioned tension member of the braided cord formed of four aramid fiber strands.

Under this structure, the synchronous belt can obtain an excellent flex fatigue resistance.

DESCRIPTION OF EMBODIMENTS

Below, embodiments of the invention will be described with reference to the drawings.

(Structures of Tension Member and Synchronous Belt)

Figure 1:
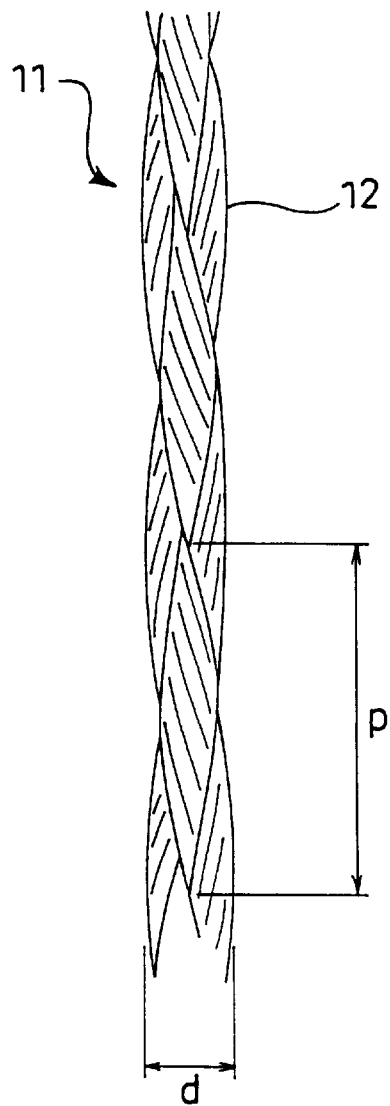
FIG. 1 is a side view showing an embodiment of a tension member formed of a braided cord of the present invention.

FIG. 1 shows a braided cord 11 as a tension member for belt. The braided cord 11 is produced by putting four aramid fiber strands 12 having the same yarn number through a braiding machine.

Figure 2:
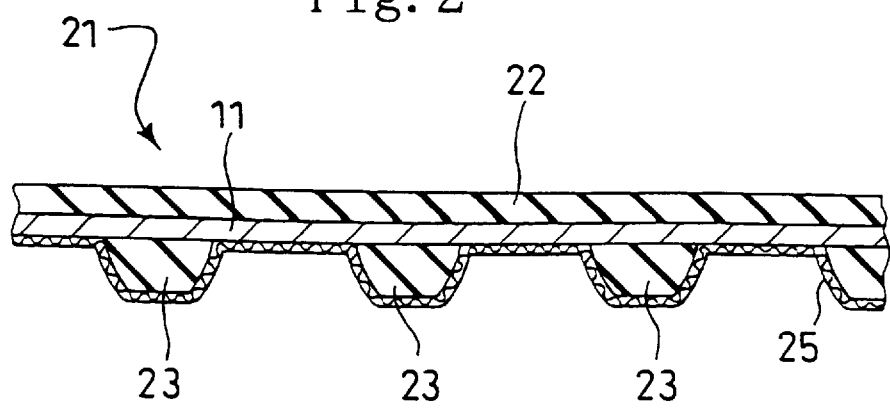
FIG. 2 is a longitudinal cross-sectional view showing an embodiment of a power transmission belt of the present invention.

FIG. 2 shows a synchronous belt 21 according to the present invention. The synchronous belt 21 is provided with the braided cord 11 as its tension member. The braided cord 11 is spirally disposed in the synchronous belt 21 so as to extend in a longitudinal direction of the belt 21 and to be arranged at specific intervals in a belt width direction. On the outer peripheral side of the tension member 11, a backing rubber part 22 is bonded so as to be continuously provided over the length of the belt 21. On the inner peripheral side of the tension member 11, a multiplicity of tooth rubber parts 23 are bonded so as to be arranged at specific intervals in the longitudinal direction of the belt 21. The power transmission belt 21 is covered at the tooth rubber parts side thereof with a facing fabric 25. Each of the tooth rubber parts 23 slightly bulges at the front and rear surfaces in the longitudinal direction of the belt 21 so as to be arcuate in sectional form.

(Method of Manufacturing Synchronous Belt)

The synchronous belt 21 can be formed by normal molding. More specifically, a rubberized fabric for facing fabric is wrapped around a mandrel whose outer periphery has the form corresponding to tooth grooves of the power transmission belt 21, a braided cord as a tension member is spirally wound around the wrapped fabric and an unvulcanised rubber sheet is then wrapped thereon for forming a backing rubber part and tooth rubber parts. Next, the substance thus obtained is put in a pressure vessel so as to be pressed from the outside. Thereby, a portion of the unvulcanised rubber sheet is extruded from adjacent cord portions of the tension member toward the rubberized fabric, so that the rubberized fabric is shaped along the form of tooth grooves of the mandrel and tooth rubber parts are formed. The molded substance thus obtained is cured and then removed from the mandrel. Thereafter, the molded substance is cut into round pieces each having a given width and is turned inside out so that its inner side and its outer side are reversed in position, thereby obtaining the synchronous belt 21.

(Preceding Treatment of Tension Member)

Before the braided cord is provided as a tension member to the synchronous belt, it is subjected to the following treatment: The braided cord made by the braiding machine is soaked in a liquid adhesive containing an isocyanate compound as a main ingredient thereby forming a sub-coating layer on the surface of the braided cord. Next, the braided cord is soaked in another liquid adhesive containing resorcinol formaldehyde latex (RFL) as a main ingredient thereby forming a second coating layer on the sub-coating layer. Thereafter, the braided cord is soaked in a rubber cement containing chloroprene rubber thereby forming a top coating layer on the second coating layer.

(Effects which Ratio p/d of Braiding Pitch p of Braided Cord to Diameter d thereof has on Flex Fatigue Resistance of Power Transmission Belt)

To examine effects which a ratio p/d of a braiding pitch p of the braided cord to a diameter d thereof has on the flex fatigue resistance of a power transmission belt, braided cords according to respective Embodiments of the invention and Comparative Examples were produced in the below-mentioned manners and the belt running test was conducted to synchronous belts using the above braided cords as tension members respectively. The respective structures of Embodiments and Comparative Examples are shown in the below-mentioned Table 1a. In FIG. 1, d indicates the diameter of the braided cord and p indicates the pitch of a pattern which repeatedly emerges on the surface of the braided cord along a longitudinal direction of the braided cord.

Embodiment 1

With the use of aramid fiber strands formed of "Technora" (trade name of aramid fiber produced by TEIJIN LIMITED) of 1000 denier, a braided cord was produced so as to have a number of braidings of 37 times per 10 cm, a braiding pitch p of 2.7 mm and a diameter d of 0.73 mm. Thereby, the ratio p/d was 3.7. The braided cord was subjected to the above-mentioned preceding treatment and thereafter a sample synchronous belt was produced using the braided cord by the above-mentioned method.

In this embodiment, the number of teeth of the synchronous belt 21 is 113, the tooth pitch of the tooth rubber parts 23 is 8 mm and the belt width is 19 mm. The distance between adjacent cord portions in a belt width direction of the tension member 11 formed of the braided cord is set at 0.25 mm in order to obtain a necessary strength of the belt while securing the adhesive property of the tension member 11 to the backing rubber part 22 and the tooth rubber parts 23.

Embodiment 2

A sample synchronous belt was produced in the same conditions and manner as in Embodiment 1, except that a braided cord was produced so as to have a number of braidings of 34 times per 10 cm, a braiding pitch p of 2.9 mm and a diameter d of 0.71 mm and therefore the ratio p/d was 4.1.

Embodiment 3

A sample synchronous belt was produced in the same conditions and manner as in Embodiment 1, except that a braided cord was produced so as to have a number of braidings of 27 times per 10 cm, a braiding pitch p of 3.7 mm and a diameter d of 0.69 mm and therefore the ratio p/d was 5.4.

Embodiment 4

A sample synchronous belt was produced in the same conditions and manner as in Embodiment 1, except that aramid fiber strands formed of "Technora" of 1500 denier were used for a braided cord, the braided cord was produced so as to have a number of braidings of 27 times per 10 cm, a braiding pitch p of 3.7 mm and a diameter d of 0.91 mm and therefore the ratio p/d was 4.1.

Embodiment 5

A sample synchronous belt was produced in the same conditions and manner as in Embodiment 1, except that aramid fiber strands formed of "Technora" of 720 denier were used for a braided cord, the braided cord was produced so as to have a number of braidings of 41 times per 10 cm, a braiding pitch p of 2.4 mm and a diameter d of 0.59 mm and therefore the ratio p/d was 4.1.

Embodiment 6

A sample synchronous belt was produced in the same conditions and manner as in Embodiment 1, except that aramid fiber strands formed of "Technora" of 500 denier were used for a braided cord, the braided cord was produced so as to have a number of braidings of 50 times per 10 cm, a braiding pitch p of 2.0 mm and a diameter d of 0.49 mm and therefore the ratio p/d was 4.1.

Comparative Example 1

A sample synchronous belt was produced in the same conditions and manner as in Embodiment 1, except that a braided cord was produced so as to have a number of braidings of 13 times per 10 cm, a braiding pitch p of 7.7 mm and a diameter d of 0.61 mm and therefore the ratio p/d was 12.6.

Comparative Example 2

A sample synchronous belt was produced in the same conditions and manner as in Embodiment 1, except that a braided cord was produced so as to have a number of braidings of 20 times per 10 cm, a braiding pitch p of 5.0 mm and a diameter d of 0.65 mm and therefore the ratio p/d was 7.7.

Comparative Example 3

A sample synchronous belt was produced in the same conditions and manner as in Embodiment 4, except that a braided cord was produced so as to have a number of braidings of 20 times per 10 cm, a braiding pitch p of 5.0 mm and a diameter d of 0.90 mm and therefore the ratio p/d was 5.6.

[Details of Flex Fatigue Test]

Figure 3:
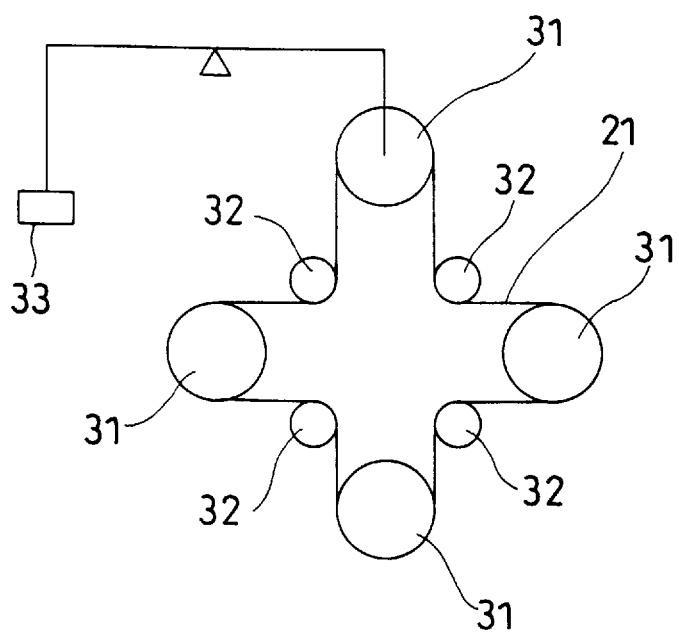
FIG. 3 is a schematic diagram showing the structure of a belt running test machine.

As shown in FIG. 3, each of the sample belts 21 was wound around four large pulleys 31 (diameter: 60 mm) and four small pulleys 32 (diameter: 30 mm) respectively disposed between the adjacent large pulleys 31. The pulleys 31, 32 form a belt bending test machine. The sample belt 21 wound around the pulleys 31, 32 was run at 5500 rpm under a load of 80 kgf by a weight 33. Then, the respective rates of remaining strength of the belt after the number of bendings of $1 \times 10^8$ and after the number of bendings of $5 \times 10^8$ were calculated and evaluation was made about the flex fatigue of the sample belts 21 based on the test results.

[Test Results]

The test results are shown in the below-mentioned Table 1b.

TABLE 1a

| | Denier of Aramid Fiber Strand | Number of Braidings (n/10 cm) | braiding Pitch (mm) p | Cord Diameter (mm) d | p/d |
|---|---|---|---|---|---|
| Embodiment 1 | 1000 | 37 | 2.7 | 0.73 | 3.7 |
| Embodiment 2 | 1000 | 34 | 2.9 | 0.71 | 4.1 |
| Embodiment 3 | 1000 | 27 | 3.7 | 0.69 | 5.4 |
| Embodiment 4 | 1500 | 27 | 3.7 | 0.91 | 4.1 |
| Embodiment 5 | 720 | 41 | 2.4 | 0.59 | 4.1 |
| Embodiment 6 | 500 | 50 | 2.0 | 0.49 | 4.1 |
| Comp. Ex. 1 | 1000 | 13 | 7.7 | 0.61 | 12.6 |
| Comp. Ex. 2 | 1000 | 20 | 5.0 | 0.65 | 7.7 |
| Comp. Ex. 3 | 1500 | 20 | 5.0 | 0.90 | 5.6 |

TABLE 1b

| | Initial Strength (kgf) | Number of Bendings $1 \times 10^8$ Ratio of Remaining Strength: % (Remaining Strength: kgf) | Number of Bendings $5 \times 10^8$ Ratio of Remaining Strength: % (Remaining Strength: kgf) |
|---|---|---|---|
| Embodiment 1 | 1130 | 95 (1074) | 93 (1051) |
| Embodiment 2 | 1180 | 95 (1121) | 88 (1038) |
| Embodiment 3 | 1250 | 93 (1162) | 83 (1038) |
| Embodiment 4 | 1380 | 88 (1214) | 80 (1104) |
| Embodiment 5 | 1030 | 97 (999) | 95 (979) |

TABLE 1b-continued

| | Initial Strength (kgf) | Number of Bendings $1 \times 10^8$ Ratio of Remaining Strength: % (Remaining Strength: kgf) | Number of Bendings $5 \times 10^8$ Ratio of Remaining Strength: % (Remaining Strength: kgf) |
|---|---|---|---|
| Embodiment 6 | 885 | 98 (867) | 96 (850) |
| Comp. Ex. 1 | 1320 | 85 (1122) | 68 (898) |
| Comp. Ex. 2 | 1350 | 78 (1053) | 55 (742) |
| Comp. Ex. 3 | 1460 | 80 (1168) | 65 (949) |

The ratio p/d corresponds to a tangent of a lead angle of a fiber strand of the braided cord. As is evident from the above Table 1a and Table 1b, if the angle is suitably set, the flex fatigue resistance of the belt can be increased. For example, when Embodiments 1 to 3 are compared with Comparative Examples 1 and 2, Embodiments 1 to 3 each have an excellent flex fatigue resistance over Comparative Examples 1 and 2. Likewise, when Embodiment 4 is compared with Comparative Example 3, Embodiment 4 has an excellent flex fatigue resistance over Comparative Example 3.

Next, comparisons are made between Embodiments 2, 4, 5 and 6. As the number of denier of the fiber strand is decreased, the initial strength of the belt becomes smaller. As is seen from this, the number of denier of the fiber strand is preferably 700 denier or more in order to obtain a suitable value of the initial strength of the belt, i.e., 1000 kgf/19 mm, and however, the larger number of denier of the fiber strand provides a disadvantage in flex fatigue resistance of the belt.

What is claimed is:

1. A tension member formed of a braided cord composed of four aramid fiber strands, each of said strands having an identical yarn number, characterized in that a ratio p/d of a braiding pitch p of the braided cord to a diameter d of the braided cord satisfies the following relationship:

$$3.7 \leq p/d \leq 5.5$$

2. The tension member according to claim 1, wherein each of the aramid fiber strands has a yarn number of 700 denier to 1300 denier.

3. A synchronous belt comprising: a tension member having respective outer and inner peripheral surfaces extending over a length of the belt; a backing rubber part bonded on the outer peripheral surface of the tension member;

and a multiplicity of tooth rubber parts which are bonded on the inner peripheral surface of the tension member and are arranged at specific intervals in a longitudinal direction of the belt, wherein the tension member is formed of a braided cord composed of four aramid fiber strands, each of said strands having as identical yarn number, and said braided cord has a ratio p/d of a braiding pitch p of the braided cord to a diameter d of the braided cord which satisfies the relationship $3.7 \leq p/d \leq 5.5$.

4. The synchronous belt according to claim 3, wherein each of the aramid fiber strands has a yarn number of 700 denier to 1300 denier.

5. A power transmission belt comprising a tension member formed of a braided cord composed of four aramid fiber strands, each of said strands having an identical yarn number, characterized in that a ratio p/d of a braiding pitch p of the braided cord to a diameter d of the braided cord satisfies the following relationship:

$$3.7 \leq p/d \leq 5.5.$$

6. A power transmission belt comprising a tension member formed of a braided cord composed of four aramid fiber strands, each of said strands having an identical yarn number, wherein each of the aramid fiber strands has a yarn number of 700 denier to 1300 denier, characterized in that a ratio p/d of a braiding pitch p of the braided cord to a diameter d of the braided cord satisfies the following relationship:

$$3.7 \leq p/d \leq 5.5.$$

* * * * *

UNITED STATES PATENT AND TRADEMARK OFFICE
CERTIFICATE OF CORRECTION

PATENT NO. : 5,876,297
DATED : Mar. 2, 1999
INVENTOR(S) : Yuji Takeuchi

It is certified that error appears in the above-identified patent and that said Letters Patent is hereby corrected as shown below:

Claim 3, line 12, please replace "as identical" with –an identical–.

Signed and Sealed this

Twentieth Day of July, 1999

Attest:

Q. TODD DICKINSON

*Attesting Officer*  *Acting Commissioner of Patents and Trademarks*